(12) United States Patent
Shikama et al.

(10) Patent No.: US 11,415,761 B2
(45) Date of Patent: Aug. 16, 2022

(54) OPTICAL FIBER GUIDE COMPONENT, OPTICAL CONNECTION STRUCTURE AND METHOD FOR PRODUCING SAME

(71) Applicant: Nippon Telegraph and Telephone Corporation, Tokyo (JP)

(72) Inventors: Kota Shikama, Tokyo (JP); Hidetaka Nishi, Tokyo (JP); Yusuke Muranaka, Tokyo (JP); Ai Yanagihara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/257,197

(22) PCT Filed: Jun. 20, 2019

(86) PCT No.: PCT/JP2019/024491
§ 371 (c)(1),
(2) Date: Dec. 30, 2020

(87) PCT Pub. No.: WO2020/017229
PCT Pub. Date: Jan. 23, 2020

(65) Prior Publication Data
US 2021/0157071 A1  May 27, 2021

(30) Foreign Application Priority Data

Jul. 17, 2018  (JP) .............................. JP2018-133949

(51) Int. Cl.
*G02B 6/42* (2006.01)

(52) U.S. Cl.
CPC ........... *G02B 6/4239* (2013.01); *G02B 6/423* (2013.01); *G02B 6/4243* (2013.01)

(58) Field of Classification Search
None
See application file for complete search history.

(56) References Cited

U.S. PATENT DOCUMENTS 5,535,296 A * 7/1996 Uchida .................. G02B 6/421
385/137
5,557,695 A   9/1996 Yamane et al.
(Continued)

FOREIGN PATENT DOCUMENTS

JP  1988041105 U  3/1988
JP  S6341105 U   3/1988
(Continued)

*Primary Examiner* — Jerry Rahll
(74) *Attorney, Agent, or Firm* — Slater Matsil, LLP

(57) ABSTRACT

An optical fiber guide part fixes optical fibers optically connected to optical waveguides of an optical waveguide device and is adhesively fixed to the optical waveguide device. The optical fiber guide part includes a V-grooved substrate, in a surface of which plural V-grooves are formed in parallel to one another, a lid member fixed to a top of the V-grooved substrate such that the V-grooves are exposed in a neighborhood of at least that end face of the V-grooved substrate which is on a side of the optical waveguide device, and a lid member fixed to an exposed part of the V-grooves of the V-grooved substrate, pressing, from above, the optical fibers inserted in guide holes formed by the V-grooves and the lid member placed on the V-grooves.

20 Claims, 15 Drawing Sheets

(56) References Cited

U.S. PATENT DOCUMENTS

| 6,947,638 B2 | 9/2005 | Abe |
| 2005/0031290 A1 | 2/2005 | Shevchuk |
| 2020/0057192 A1 | 2/2020 | Nakanishi et al. |

FOREIGN PATENT DOCUMENTS

| JP | H0713038 A | 1/1995 |
| JP | H0829638 A | 2/1996 |
| JP | H0843676 A | 2/1996 |
| JP | 2003177272 A | 6/2003 |
| JP | 200478028 A | 3/2004 |
| JP | 201410334 A | 1/2014 |
| JP | 201877276 A | 5/2018 |

* cited by examiner

OPTICAL FIBER GUIDE COMPONENT, OPTICAL CONNECTION STRUCTURE AND METHOD FOR PRODUCING SAME

CROSS-REFERENCE TO RELATED APPLICATIONS

This patent application is a national phase filing under section 371 of PCT/JP2019/024491, filed Jun. 20, 2019, which claims the priority of Japanese application number 2018-133949, filed Jul. 17, 2018, each of which is incorporated herein by reference in its entirety.

TECHNICAL FIELD

The present invention relates to an optical fiber guide part and an optical connection structure used to connect optical fibers to an optical waveguide device as well as a manufacturing method therefor.

BACKGROUND

In recent years, with increases in personal traffic consumption due to video services as well as increases in corporation traffic due to IoT (Internet of Things) and cloud services, there has been demand for significant expansion of channel capacity within data centers or between data centers. To achieve expansion of the channel capacity, optical interconnection technology that uses optical transmission technology and the like used in optical communications is being introduced in substitution for a short-haul communications scheme that uses conventional electrical signals.

A typical scheme of optical interconnection implements signal processing by transmitting signals between a light-emitting element such as a laser diode (LD) placed on a printed circuit board and a light-receiving element such as a photodiode (PD) using an optical transmission medium such an optical waveguides or optical fibers.

Depending on the transmission system, the light-emitting element has light modulation elements and other elements integrated therein or is connected discretely with light modulation elements and other elements, and moreover, is connected with drivers and the like that carry out electro-optical conversion. A configuration including the light emission element, light modulation elements, and drivers is mounted on a printed circuit board as an optical transmitter. Similarly, the light-receiving element has optical processors and other elements integrated therein as appropriate or is connected discretely with optical processors and other elements, and moreover, is connected with an electrical amplifier circuit and the like that carry out optical-electrical conversion. A configuration including the light-receiving element, optical processors, and electrical amplifier circuit is mounted on a printed circuit board as an optical receiver.

An optical transmitter-receiver or the like resulting from integration of the optical transmitter and optical receiver is mounted in a package or on a printed circuit board and is optically connected with an optical transmission medium such as optical fibers, thereby implementing optical interconnection. Also, depending on topology, optical interconnection is implemented by repeaters such as optical switches.

As the light-emitting element, light-receiving element, and light modulation element, circuit elements using materials such as silicon, germanium, or other semiconductors, or group III-V semiconductors represented by indium phosphor (InP), gallium arsenide (GaAs), indium gallium arsenide (InGaAs) and the like have been put to practical use. In recent years, an optical transmitter-receiver of an optical waveguide type has been being developed by integrating silicon optical circuits, indium phosphorus optical circuits, and other circuits with the above circuit elements, the circuits having a light propagation mechanism. Also, for the light modulation element, besides a semiconductor, a ferroelectric substance such as lithium niobate or a material such as a polymer may be used.

Furthermore, an optical functional element made up of a planar lightwave circuit or the like made of silica glass or the like may be integrated with the light-emitting element, light-receiving element, and light modulation element. Examples of the optical functional element include a splitter, wavelength multiplexer/demultiplexer, optical switch, polarization control element, and optical filter. Hereinafter, a device resulting from integration of a light-emitting element, light-receiving element, light modulation element, optical functional element, optical amplification element, and the like having the light propagation mechanism and waveguide mechanism will be referred to as an optical waveguide device.

Normally, an optical waveguide device is connected to an optical fiber array integrated with glass or the like in which a V-groove is formed. In this structure, there is demand to connect cores of optical fibers with waveguide cores of an optical waveguide device with low losses. For the low-loss connection, it is necessary to position (hereinafter, align) and fix the optical waveguide device and optical fibers by the submicron. A conventional optical waveguide device is mounted in a package or on a board after being aligned and integrated with an optical fiber array. However, because optical fibers are complicated to handle, there is demand to enable aligning and fixing an optical waveguide device and optical fibers simply in a package or on a board.

Many methods for positioning and fixing an optical waveguide device and optical fibers in a simple manner have been proposed. A typical method for simplification involves changing a conventional method of moving the optical waveguide device and optical fibers using a gripping/operating device with light being inputted and outputted to/from an optical waveguide device and optical fibers and achieving alignment at an optimum position (hereinafter referred to as optical alignment) to a method of achieving alignment using mechanical positioning.

As one way of achieving alignment using mechanical positioning, a method has been proposed that involves aligning and fixing an optical fiber guide part having plural guide holes for insertion of optical fibers with/to an optical waveguide device in advance using optical alignment or the like and inserting optical fibers into the guide holes in the optical fiber guide part on a board or in a package, and fixing the optical fibers (see Patent Literature 1). As shown in FIG. 21, an optical fiber guide part 100 described in Patent Literature 1 includes a V-grooved substrate 101 in which plural V-grooves 102 are formed, dummy optical fibers 103 placed in two V-grooves 102a on both sides out of the plural V-grooves 102, and a tabular lid 104 integrated with the V-grooved substrate 101 via a bonding layer 105.

As shown in the plan view of FIG. 22(A) and sectional view of FIG. 22(B), the optical fiber guide part 100 is integrated with an optical waveguide device 106 by adhesive or the like. The optical waveguide device 106 includes a waveguide substrate 107, a clad 108 formed on the waveguide substrate 107, and cores 109 formed in the clad 108. Optical fibers 110 are fixed to a plug 111. Also, a non-illustrated connector receptacle is fixed to the optical fiber guide part 100. When the plug 111 is inserted and fitted into the connector receptacle, the optical fibers 110 are inserted into guide holes and positioned, where the guide holes are formed by the V-grooves 102 and the lid 104 of the optical fiber guide part 100. Then, end faces of the optical fibers 110 are butted against end faces of the cores 109 of the optical waveguide device 106. In this way, the optical fibers 110 are optically connected to the cores 109 of the optical waveguide device 106. To reinforce bonding of the optical waveguide device 106 to the optical fiber guide part 100, a reinforcement plate 112 made of glass is stuck to the optical waveguide device 106.

The guide holes of the optical fiber guide part 100 are formed by the V-grooves 102 and the lid 104, and diameters of the guide holes are determined by diameters of the dummy optical fibers 103 placed in the two V-grooves 102a on both sides. To allow insertion of the optical fibers 110 into the guide holes, the guide holes are set to be slightly larger in diameter than the optical fibers 110. If a difference in diameter between the guide holes and the optical fibers 110 is defined as a clearance, clearances on the order of submicrons are needed. That is, the dummy optical fibers 103 are set larger in diameter than the optical fibers 110.

However, under circumstances in which there are clearances such as described above, there is a problem in that some axial misalignment occurs between the cores 109 of the optical waveguide device 106 and cores of the optical fibers 110, causing increases in light loss. In particular, in silicon optical circuits which use silicon as cores, silicon optical circuits being used for optical interconnection and the like, because trapping of light is significant, tolerances for the axial misalignment are small, resulting in the need for more precise reduction of axial misalignment.

CITATION LIST

Patent Literature

Patent Literature 1: Japanese Patent Laid-Open No. 2004-78028

SUMMARY

Technical Problem

An embodiment of the present invention has been made to solve the above problem and has an object to provide an optical fiber guide part, optical connection structure, and manufacturing method therefor that can implement low-loss optical connection by reducing axial misalignment between optical waveguides of an optical waveguide device and optical fibers while simplifying a mounting step.

Means for Solving the Problem

An embodiment of the present invention provides an optical fiber guide part that fixes optical fibers optically connected to optical waveguides of an optical waveguide device and is adhesively fixed to the optical waveguide device, optical fiber guide part comprising: a V-grooved substrate, in a surface of which a plurality of V-grooves are formed in parallel to one another; a first lid member fixed to a top of the V-grooved substrate such that the V-grooves are exposed in a neighborhood of at least that end face of the V-grooved substrate which is on a side of the optical waveguide device; and a second lid member fixed to exposed part of the V-grooves of the V-grooved substrate, pressing, from above, optical fibers inserted in guide holes formed by the V-grooves and the first lid member placed on the V-grooves, wherein the optical fiber guide part is adhesively fixed to the optical waveguide device under a condition in which those end faces of the optical fibers inserted in the guide holes which are on the side of the optical waveguide device and those end faces of the optical waveguides which are on a side of the optical fiber guide part are positioned so as to face each other.

In a configuration example of the optical fiber guide part according to embodiments of the present invention, the optical fibers inserted in the guide holes include a dummy optical fiber larger in outside diameter than the optical fibers optically connected to the optical waveguides of the optical waveguide device.

Also, in another configuration example of the optical fiber guide part according to embodiments of the present invention, the optical fibers inserted in the guide holes include an aligning optical fiber optically connected to an aligning optical waveguide of the optical waveguide device.

Also, in another configuration example of the optical fiber guide part according to embodiments of the present invention, on an undersurface facing the exposed part of the V-grooves of the V-grooved substrate, the second lid member includes a plurality of protrusions formed in parallel to the V-grooves with a same pitch as the V-grooves, and the protrusions are fixed to the exposed part of the V-grooves of the V-grooved substrate, pressing, from above, the optical fibers inserted in the guide holes.

Also, in another configuration example of the optical fiber guide part according to embodiments of the present invention, the second lid member is fixed to the exposed part of the V-grooves of the V-grooved substrate by an elastic adhesive provided on an undersurface facing the exposed part of the V-grooves of the V-grooved substrate, the optical fiber guide part further comprising a pressing mechanism adapted to press the second lid member from above.

Also, in another configuration example of the optical fiber guide part according to embodiments of the present invention, the second lid member is shaped to continuously cover surfaces from the exposed part of the V-grooves of the V-grooved substrate to an upper surface of the optical waveguide device adjacent to the optical fiber guide part, and that part of the second lid member which faces the upper surface of the optical waveguide device is fixed to the optical waveguide device.

Also, in another configuration example of the optical fiber guide part according to embodiments of the present invention, the V-grooved substrate of the optical fiber guide part includes a dug portion formed by removing an end portion on the side of the optical waveguide device to a position deeper than the V-grooves from a surface, the optical fiber guide part further comprising a functional element provided in the dug portion and adapted to match mode field size between the optical fibers inserted in the guide holes and the optical waveguides of the optical waveguide device.

Also, an embodiment of the present invention provides an optical connection structure comprising: an optical waveguide device; and an optical fiber guide part.

Also, an embodiment of the present invention provides a manufacturing method for an optical connection structure that adhesively fixes an optical fiber guide part to an optical waveguide device, the optical fiber guide part including a V-grooved substrate, in a surface of which a plurality of V-grooves are formed in parallel to one another, and a first lid member adhesively fixed to a top of the V-grooved substrate such that the V-grooves are exposed in a neighborhood of an end face of the V-grooved substrate, the manufacturing method comprising the steps of: doing positioning such that those end faces of the optical fibers which are on a side of the optical waveguide device and those end faces of the optical waveguides of the optical waveguide device which are on a side of the optical fiber guide part face each other, the optical fibers being inserted in guide holes formed by the V-grooves and the first lid member placed on the V-grooves; adhesively fixing the optical fiber guide part to the optical waveguide device with the positioning achieved; and fixing a second lid member to exposed part of the V-grooves of the V-grooved substrate on the side of the optical waveguide device by pressing, from above, the optical fibers inserted in the guide holes.

Effects of Embodiments of the Invention

With embodiments of the present invention, when the second lid member is not mounted on the optical fiber guide part, the optical fiber can be inserted easily into the guide holes in the optical fiber guide part and if the second lid member is fixed to the optical fiber guide part under a condition in which those end faces of the optical fibers inserted in the guide holes which are on the side of the optical waveguide device and those end faces of the optical waveguides of the optical waveguide device which are on the side of the optical fiber guide part are positioned so as to face each other, it is possible to reduce axial misalignment between the optical waveguides and optical fibers. Consequently, embodiments of the present invention can implement low-loss optical connection while simplifying a mounting step.

DETAILED DESCRIPTION OF ILLUSTRATIVE EMBODIMENTS

First Embodiment

Figure 1:
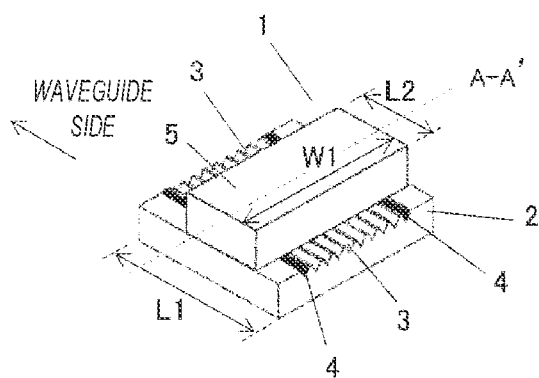
FIG. 1 is a perspective view showing a configuration of an optical fiber guide part according to a first embodiment of the present invention.

Embodiments of the present invention will be described in detail below with reference to the accompanying drawings. FIG. 1 is a perspective view showing a configuration of an optical fiber guide part according to a first embodiment of the present invention. The optical fiber guide part 1 according to the present embodiment includes a V-grooved substrate 2 which is made, for example, of glass and in which plural V-grooves 3 are formed, dummy optical fibers 4 placed in two V-grooves 3 on both sides out of the plural V-grooves 3, and a tabular lid member 5 made, for example, of glass and integrated with the V-grooved substrate 2 by adhesive.

Plural (ten, according to the present embodiment) V-grooves 3 equal in depth are formed in parallel to one another with a fixed pitch in a surface of the tabular V-grooved substrate 2 quadrangular in planar view. The optical fiber guide part 1, on which the dummy optical fibers 4 are placed in the two V-grooves 3 on both sides, is designed to be able to hold an 8-core optical fiber cable. Regarding the number of cores in the optical fiber cable, although an 8-core cable is illustrated as a representative example, naturally the present invention is not limited to 8-core cables. Also, although in the present embodiment, single-mode optical fibers with an outside clad diameter of 80 μm are shown as an example of optical fibers inserted into the guide holes in the optical fiber guide part 1, an outside fiber diameter, core diameter, fiber type (multi-mode fiber or polarization-maintaining fiber), and the like are not limited to those of the present example, and may be selected as appropriate.

Figure 21:
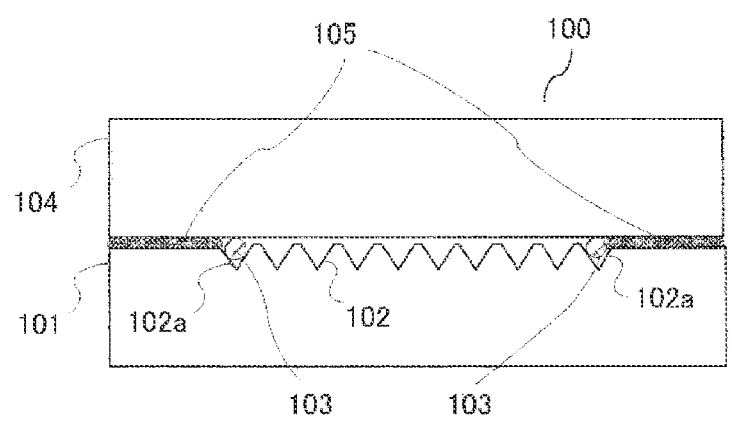
FIG. 21 is a sectional view showing a configuration of a conventional optical fiber guide part.
Figure 22A:
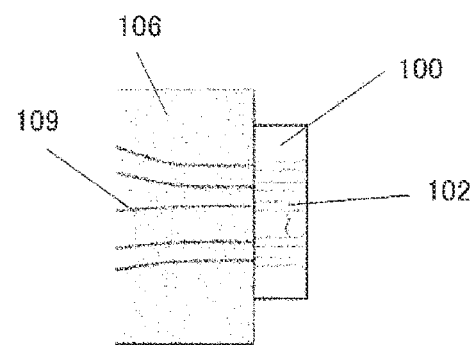
FIGS. 22(A) and 22(B) are a plan view and a sectional view, respectively, showing a configuration in which a conventional optical waveguide device and the conventional optical fiber guide part are integrated.
Figure 22B:
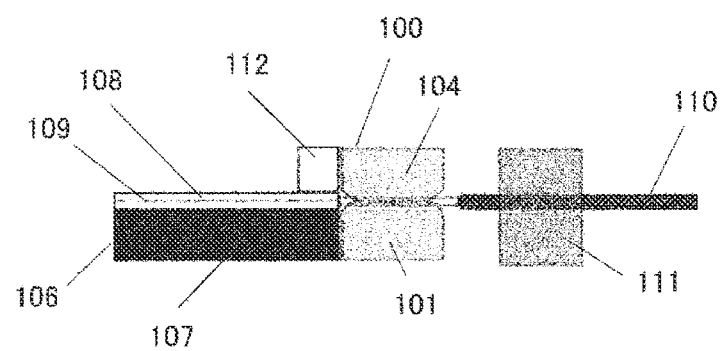

As is conventionally the case, guide holes triangular in cross section in a direction orthogonal to a light propagation direction (extending direction of the V-grooves 3) are formed by the V-grooves 3 in the V-grooved substrate 2 of the optical fiber guide part 1 and the lid member 5 placed on the V-grooves 3. The dummy optical fiber 4 is slightly larger in outside diameter than the optical fiber inserted into each guide hole in the optical fiber guide part 1. The V-grooved substrate 2 and the lid member 5 are pasted together by adhesive in those regions of the V-grooved substrate 2 in which the V-grooves 3 are absent. Therefore, the sectional structure of the optical fiber guide part 1 along line A-A' in FIG. 1 is similar to the sectional structure of FIG. 21.

In this way, the optical fiber guide part 1 has the same structure as the conventional one in a section along line A-A', but differs from the conventional one in end face structure on the optical waveguide device side as well as on the optical fiber insertion side. In the example of FIG. 1, the far side corresponds to the optical waveguide device side and the near side corresponds to the optical fiber insertion side. A width W1 of the lid member 5 in a direction orthogonal to the light propagation direction (extending direction of the V-grooves 3) is equal to the width of the V-grooved substrate 2, but a length L2 of the lid member 5 in the light propagation direction is shorter than a length L1 of the V-grooved substrate 2, exposing surfaces of the V-grooved substrate 2 on the optical waveguide device side and the optical fiber insertion side.

Figure 2:
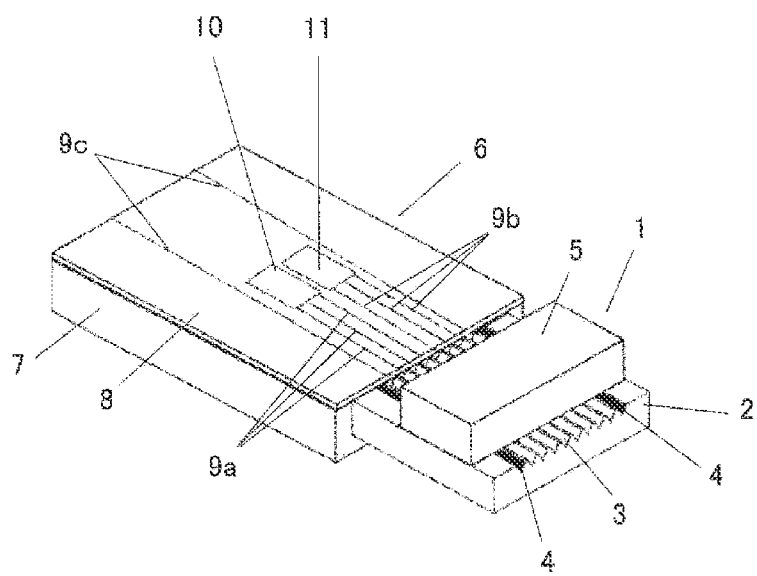
FIG. 2 is a perspective view showing an example of an optical connection structure according to the first embodiment of the present invention.

FIG. 2 is a perspective view showing an example of an optical connection structure according to the present embodiment. Note that FIG. 2 illustrates cores and elements in a clad of an optical waveguide device 6 by seeing through the clad. Similar illustration method will be adopted in subsequent drawings as well.

The optical waveguide device 6 includes a silicon substrate 7, a clad 8 made of $SiO_2$ and formed on the silicon substrate 7, cores 9a, 9b, and 9c made of silicon and formed in the clad 8, a transmitter array 10 made of a semiconductor and formed in the clad 8, and a receiver array 11 made of a semiconductor and formed in the clad 8. A pitch of the cores 9a, 9b, and 9c on those end faces of the optical waveguide device 6 which are on the side of the optical fiber guide part is the same as the pitch of the V-grooves 3.

Eight channels of cores 9a, 9b, and 9c are formed in the clad 8 and two cores 9c on opposite ends and the clad 8 make up penetration-only aligning optical waveguides. The clad 8 contains the transmitter array 10 that includes laser diodes (LDs) as external light sources for three channels and modulators for use to modulate light from the LDs. Outputs from the three channels of modulators are optically connected with three channels of optical waveguides made up of three cores 9a and the clad 8. Furthermore, the clad 8 contains the receiver array 11 made up of germanium photodiodes (Ge-PDs) for three channels. The PDs are optically connected with three channels of optical waveguides made up of three cores 9b and the clad 8.

By bonding the optical fiber guide part 1 to the optical waveguide device 6 configured as described above, mounting the optical waveguide device 6 and optical fiber guide part 1 in a package or on a printed circuit board, and electrically connecting the elements on the optical waveguide device 6 with external devices via wires or the like, it is possible to configure an optical transmitter-receiver for optical interconnection.

Note that as described above, the number of channels, the configurations, the materials, the integration method, and the like of the elements on the optical waveguide device 6 (transmitter array 10, receiver array 11, optical functional element, optical amplification element, and the like) may be selected as appropriate.

A spot size converter (not shown) is formed in a neighborhood of that connection end face of the optical waveguide device 6 which is on the side of the optical fiber guide part, where the spot size converter increases mode field sizes of the optical waveguides for eight channels towards the optical fiber guide part 1. The spot size converter makes it possible to match mode field size between the optical waveguides and optical fibers. The spot size converter is a known element, and thus detailed description thereof will be omitted.

Figure 3:
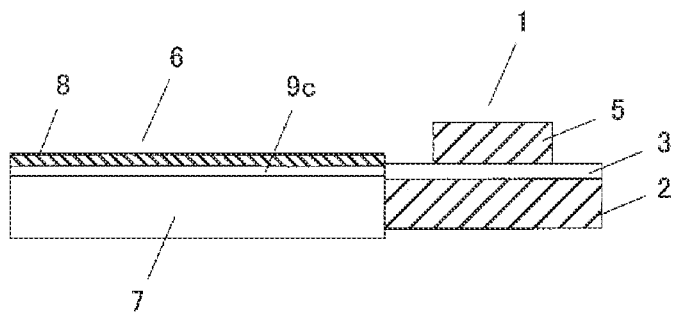
FIG. 3 is a sectional view of the optical connection structure of FIG. 2.

A UV-cure adhesive is applied to that connection end face of the V-grooved substrate 2 of the optical fiber guide part 1 which is on the side of the optical waveguide device or to that connection end face of the optical waveguide device 6 which is on the side of the optical fiber guide part 1, and the connection end face of the V-grooved substrate 2 and connection end face of the optical waveguide device 6 are opposed to each other. Subsequently, the optical waveguide device 6 and optical fibers are optically aligned with each other, and then the UV-cure adhesive is irradiated with ultraviolet rays, and the optical fiber guide part 1 and the optical waveguide device 6 are joined together as shown in FIG. 2. FIG. 3 is a sectional view of the optical connection structure of FIG. 2.

Note that desirably grooves are cut in the connection end face of the V-grooved substrate 2 or connection end face of the optical waveguide device 6 and a UV-cure adhesive is applied to that region of the connection end face of the V-grooved substrate 2 in which no V-groove 3 is formed or to that region of the connection end face of the optical waveguide device 6 in which light does not propagate, such that a region in which the V-grooves 3 are formed and a region in which no V-groove 3 is formed (in other words, a region in which waveguides for light propagation is formed and a region in which light does not propagate) will be divided from each other. This makes it possible to prevent the UV-cure adhesive from infiltrating into the part containing the V-grooves 3.

The optical fibers inserted into the guide holes formed by the V-grooves 3 in the V-grooved substrate 2 and the lid member 5 placed on the V-grooves 3 have an outside clad diameter of 80 μm. On the other hand, an outside clad diameter of the dummy optical fibers 4 placed in the two V-grooves 3 on both sides is set to about 81 μm. As described above, the lid member 5 and the V-grooved substrate 2 are pasted together by adhesive, and in the stage of pasting, the lid member 5 is bonded to the V-grooved substrate 2 without being pressed. Therefore, the 81-μm diameter dummy optical fibers 4 placed in the V-grooves 3 is pressed only slightly by the weight of the lid member 5, and almost does not deform. Thus, a clearance, which is a difference between a diameter of an inscribed circle on an inner wall of the guide hole formed by each V-groove 3 and the lid member 5 from the outside diameter (80 μm) of the optical fiber inserted into the guide hole, is about 1 μm.

Note that section size of the V-grooves 3 needs to be set such that the optical fibers (aligning optical fibers 12 and optical fibers 14 described later) having an outside clad diameter of 80 µm and inserted in the guide holes will deform slightly by being pressed against bottoms of the V-grooves 3 by the lid member 13 when a lid member 13 described later is mounted on the V-grooved substrate 2 and pressed from above.

Figure 4:
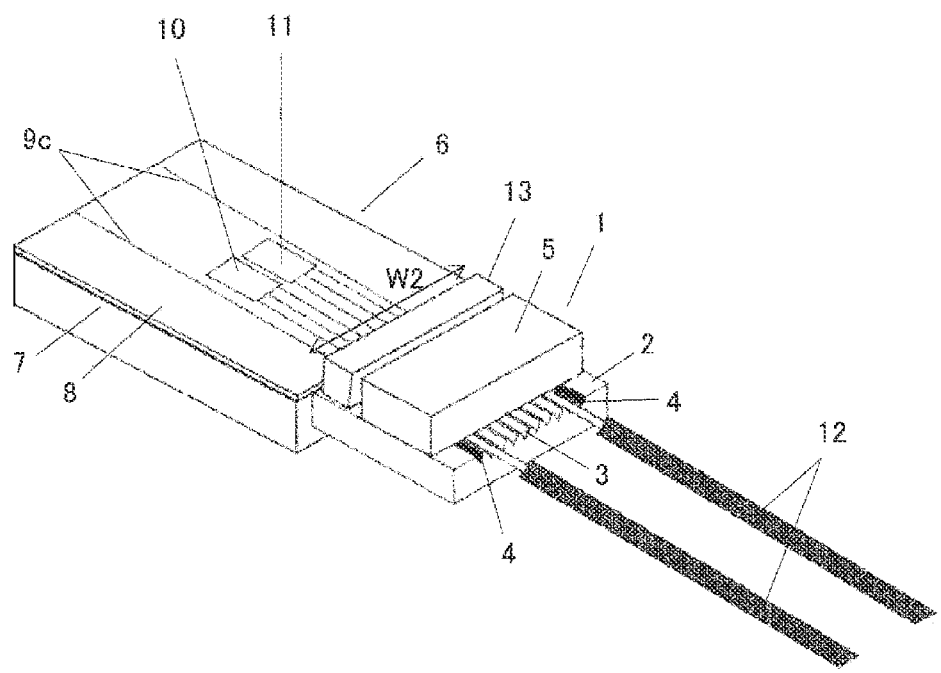
FIG. 4 is a perspective view explaining a method for optical alignment between an optical waveguide device according to the first embodiment of the present invention and optical fibers.
Figure 5:
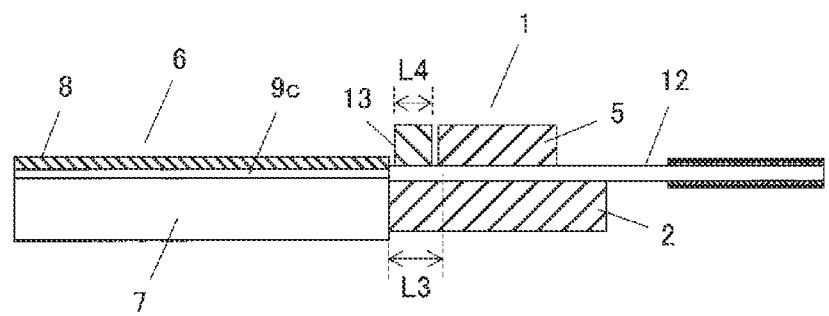
FIG. 5 is a sectional view of the optical connection structure of FIG. 4.

Next, a method for optical alignment between the optical waveguide device 6 and the optical fibers will be described with reference to FIGS. 4 and 5. FIG. 4 is a perspective view of an optical connection structure during optical alignment and FIG. 5 is a sectional view of the optical connection structure of FIG. 4. On inner sides of the two dummy optical fibers 4, aligning optical fibers 12 are inserted, respectively, in the two guide holes of the eight guide holes of the optical fiber guide part 1 as shown in FIG. 4. As can be seen from the above description, end faces of the aligning optical fibers 12 are butted against end faces of the cores 9c that make up aligning optical waveguides of the optical waveguide device 6.

Here, since the clearances between the guide holes in the optical fiber guide part 1 and the aligning optical fibers 12 inserted into the guide holes are set to about 1 µm as described above, axial misalignment can occur between the cores 9c of the optical waveguide device 6 and cores of the aligning optical fibers 12.

Thus, in the present embodiment, as shown in FIGS. 4 and 5, the lid member 13, for example, shaped as a rectangular parallelepiped and made of glass is put on an exposed part of the V-grooves of the optical fiber guide part 1 on the side of the optical waveguide device 6, covering the dummy optical fibers 4 and the aligning optical fibers 12, and is then pressed from above. A length L4 of the lid member 13 in the light propagation direction (extending direction of the V-grooves 3) is equal to or shorter than a length L3 of the exposed part of the V-grooves of the optical fiber guide part 1 on the side of the optical waveguide device 6. Also, a width W2 of the lid member 13 in a direction orthogonal to the light propagation direction is large enough (e.g., equal to the width of the V-grooved substrate 2) to cover the two dummy optical fibers 4 and two aligning optical fibers 12 exposed from the V-grooves 3.

When the lid member 13 is pressed from above, the dummy optical fibers 4 and the aligning optical fibers 12 are pushed by the lid member 13 and thereby pressed against the bottoms of the V-grooves 3. That is, in a neighborhood of that connection end face of the optical fiber guide part 1 which is on the side of the optical waveguide device 6, the two aligning optical fibers 12 remain positioned without any clearance.

With the lid member 13 being pressed from above in this way, when light is input to the two aligning optical fibers 12, the input light propagates through the aligning optical fibers 12, then enters two optical waveguides made up of the two cores 9c and clad 8 of the optical waveguide device 6, propagates through the optical waveguides, and then exits through that end face of the optical waveguide device 6 which is opposite to the optical fiber guide part 1. A VCSEL (vertical cavity surface emitting laser) PD (photodiode) is placed ahead of the end face in advance, two rays of light emitted from the two optical waveguides are received by the VCSEL PD, and the position of the optical fiber guide part 1 with respect to the optical waveguide device 6 is determined so as to maximize intensity of the two rays. Then, the UV-cure adhesive applied to a junction of the optical fiber guide part 1 and the optical waveguide device 6 is irradiated with ultraviolet rays, and consequently the optical fiber guide part 1 and the optical waveguide device 6 are joined together. This ends the optical alignment.

Note that the method for optical alignment may use the aligning optical fibers 12 and a VCSEL PD as described above, or a loopback circuit, optical fibers with a circulator, and the like. Alternatively, a receiver array 11 may be used with the aligning optical fibers 12 being placed such that light will enter the receiver array 11 on the optical waveguide device 6. That is, any appropriate known method may be used.

Figure 6:
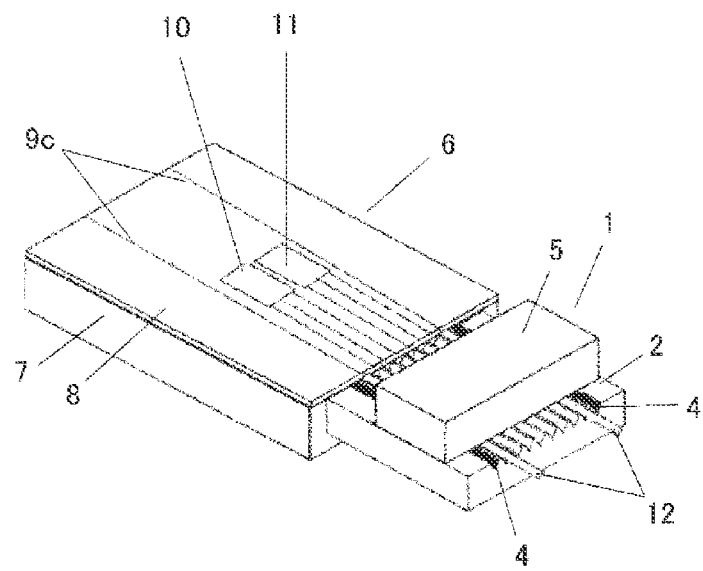
FIG. 6 is a perspective view showing the optical connection structure with aligning optical fibers cut after optical alignment in the first embodiment of the present invention.

After the optical alignment, the two aligning optical fibers 12 may be pulled out, or may be cut off as shown in FIG. 6. Note that in the stage of FIGS. 4 to 6, the lid member 13 is placed only temporarily on the optical fiber guide part 1, but is not bonded.

Figure 7A:
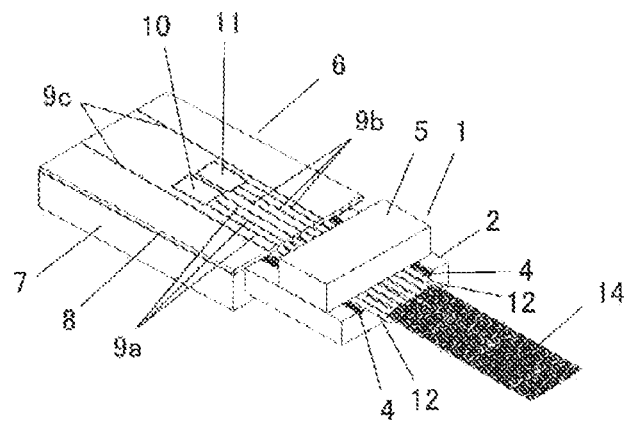
FIGS. 7(A) and 7(B) are perspective views showing the optical connection structure with optical fibers inserted in the optical fiber guide part after optical alignment and the optical connection structure with a lid member bonded to the optical fiber guide part, respectively, in the first embodiment of the present invention.
Figure 7B:
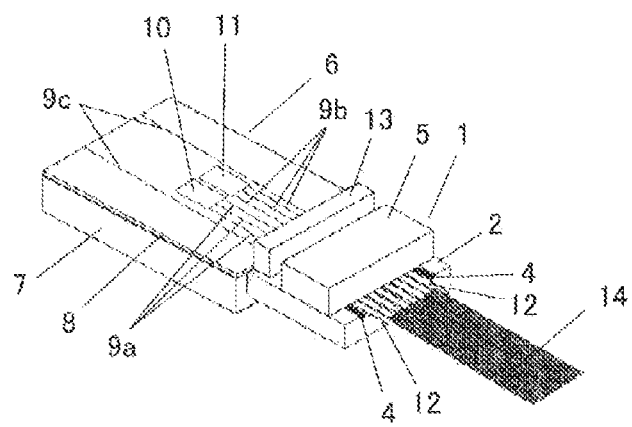

FIG. 7(A) is a perspective view showing the optical connection structure with optical fibers inserted in the optical fiber guide part 1 after optical alignment, and FIG. 7(B) is a perspective view showing the optical connection structure with the lid member 13 bonded to the optical fiber guide part 1 in addition.

In the absence of the lid member 13, a clearance of about 1 µm is provided in each guide hole in the optical fiber guide part 1 as described above. This makes it possible to insert a 6-core optical fiber cable 14 relatively easily into six guide holes excluding the guide holes in which the dummy optical fibers 4 and the aligning optical fibers 12 are inserted, as shown in FIG. 7(A). An end face of the 6-core optical fiber cable 14 butts against the end faces of the cores 9a and 9b making up six optical waveguides of the optical waveguide device 6.

Subsequently, a UV-cure adhesive is applied to the exposed part of the V-grooves of the optical fiber guide part 1 on the side of the optical waveguide device or to an undersurface of the lid member 13, and as shown in FIG. 7(B), the lid member 13 is mounted on the exposed part of the V-grooves, covering the dummy optical fibers 4, the aligning optical fibers 12, and the optical fibers 14, and is then pressed from above. Consequently, the dummy optical fibers 4, the aligning optical fibers 12, and the optical fibers 14 are pushed by the lid member 13 and thereby pressed against the bottoms of the V-grooves 3. That is, in the neighborhood of that connection end face of the optical fiber guide part 1 which is on the side of the optical waveguide device 6, the optical fibers 14 are kept positioned by the guide holes without any clearance.

With the lid member 13 being pressed from above in this way, the UV-cure adhesive is irradiated with ultraviolet rays, bonding the lid member 13 to the optical fiber guide part 1, and consequently the optical fibers 14 are fixed to the optical fiber guide part 1.

Note that to reinforce the optical fibers 14, an appropriate member may be further bonded to the V-grooved substrate 2 of the optical fiber guide part 1, supporting that part of the optical fibers 14 which are in a neighborhood of the optical fiber guide part.

With the above configuration, the present embodiment achieves marked effect as follows. Conventionally, there remain clearances between guide holes and optical fibers inserted in the guide holes, even after optical alignment is finished. In contrast, according to the present embodiment, the optical fibers 14 can be inserted easily into the guide holes when the lid member 13 is not mounted on the optical fiber guide part 1. Then, optical alignment is carried out with the clearances in the guide holes eliminated by mounting the lid member 13 on the optical fiber guide part 1 and the lid member 13 is bonded to the optical fiber guide part 1 after the end of the optical alignment, thereby making it possible to reduce axial misalignment between the cores 9a and 9b of the optical waveguide device 6 and cores of the optical fibers 14. Consequently, the present embodiment can implement extremely low-loss optical connection.

Figure 8:
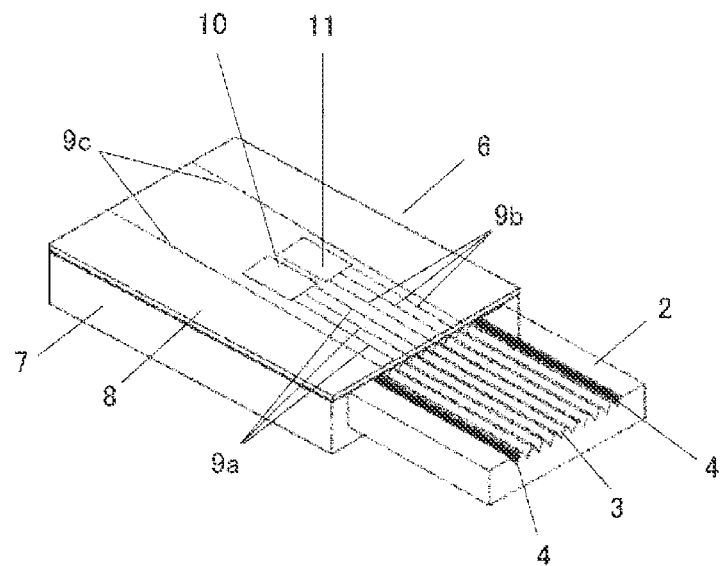
FIG. 8 is a perspective view showing another example of the optical connection structure according to the first embodiment of the present invention.

Note that the present embodiment is also applicable to a case in which only the V-grooved substrate 2 is used by eliminating the lid member 5 as shown in FIG. 8. In this case, because there is no guide mechanism for insertion of optical fibers, the difficulty level of the operation of mounting the optical fibers on the V-grooves 3 is increased, but if a guide mechanism similar to the lid member 5 is installed separately using an appropriate jig (not shown) or the like, effects similar to those of the present embodiment can be achieved.

Second Embodiment

Figure 9:
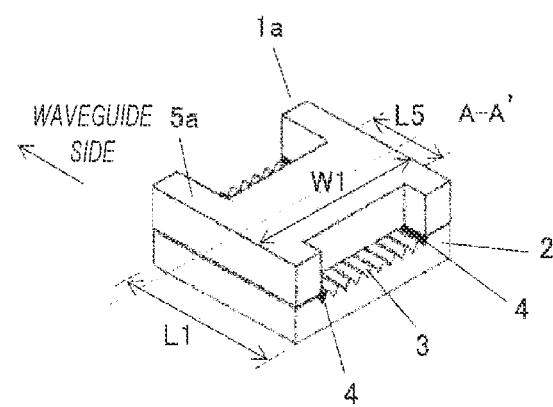
FIG. 9 is a perspective view showing a configuration of an optical fiber guide part according to a second embodiment of the present invention.

Next, a second embodiment of the present invention will be described. FIG. 9 is a perspective view showing a configuration of an optical fiber guide part according to the present embodiment, where the same components as those in FIG. 1 are denoted by the same reference signs as the corresponding components in FIG. 1. The optical fiber guide part 1a according to the present embodiment includes a V-grooved substrate 2, dummy optical fibers 4, and a lid member 5a made, for example, of glass and integrated with the V-grooved substrate 2 by adhesive.

The V-grooved substrate 2 and dummy optical fibers 4 are as described in the first embodiment. The lid member 5a is provided with a flat undersurface facing the V-grooved substrate 2 and is made of glass as with the lid member 5 of the first embodiment. The width W1 of the lid member 5a in the direction orthogonal to the light propagation direction (extending direction of the V-grooves 3) is equal to the width of the V-grooved substrate 2 and a length L5 of a central part of the lid member 5a in the light propagation direction is shorter than the length L1 of the V-grooved substrate 2. Therefore, the V-grooves 3 in the V-grooved substrate 2 are exposed on the optical waveguide device side and optical fiber insertion side as with the first embodiment.

As with the first embodiment, the V-grooved substrate 2 and the lid member 5a are pasted together by adhesive in those regions of the V-grooved substrate 2 in which the V-grooves 3 are absent, and in the stage of pasting, the lid member 5a is bonded to the V-grooved substrate 2 without being pressed. Therefore, as with the first embodiment, there are clearances between the guide holes having a triangular cross section and the optical fibers (aligning optical fibers 12 and optical fibers 14) inserted into the guide holes, where the guide holes are formed by the V-grooves 3 in the V-grooved substrate 2 in conjunction with the lid member 5a placed on the V-grooves 3.

Figure 10A:
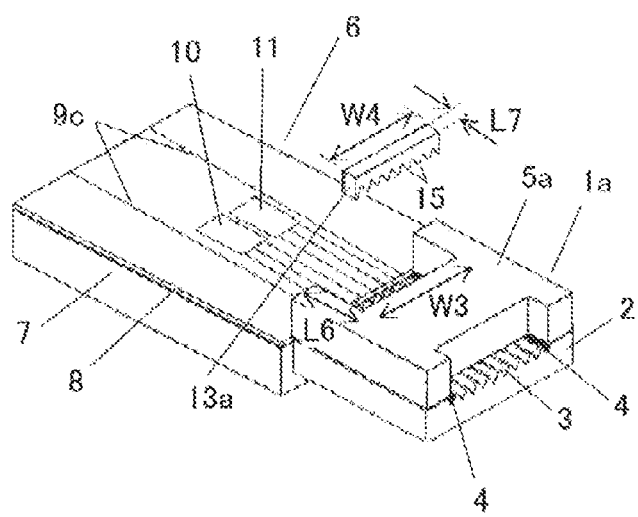
FIGS. 10(A) and 10(B) are perspective views showing an example of an optical connection structure according to the second embodiment of the present invention.
Figure 10B:
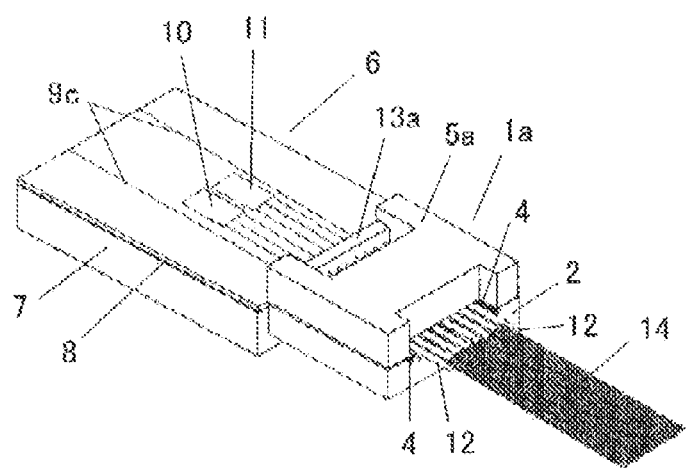

FIGS. 10(A) and 10(B) are perspective views showing an example of an optical connection structure according to the present embodiment, where FIG. 10(A) shows a state before insertion of optical fibers and FIG. 10(B) shows a state after insertion of the optical fibers.

According to the present embodiment, for example, a member shaped as a substantially rectangular parallelepiped and made of glass is used as a lid member 13a adapted to press the aligning optical fibers inserted into the optical fiber guide part 1a during optical alignment and the optical fibers 14 inserted into the optical fiber guide part 1a after the optical alignment. A length L7 of the lid member 13a in the light propagation direction (extending direction of the V-grooves 3) is equal to or shorter than a length L6 of an exposed part of the V-grooves of the optical fiber guide part 1a on the side of the optical waveguide device 6. Also, a width W4 of the lid member 13a in a direction orthogonal to the light propagation direction is equal to or shorter than a width W3 of the exposed part of the V-grooves.

As many protrusions 15 as there are V-grooves 3 are formed on an undersurface of the lid member 13a facing the exposed part of the V-grooves of the optical fiber guide part 1a on the side of the optical waveguide device 6, where the protrusions 15 are triangular in cross section in the direction orthogonal to the light propagation direction (extending direction of the V-grooves 3). The plural protrusions 15 are equal in height and are formed in parallel to one another with the same pitch as the V-grooves 3.

Figure 11A:
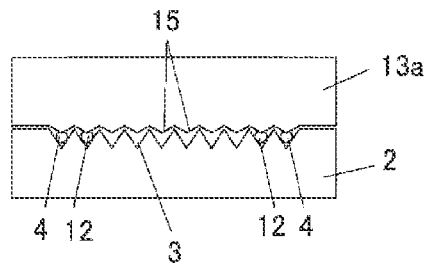
FIGS. 11(A) and 11(B) are sectional views of the optical fiber guide part with optical fibers inserted during and after optical alignment in the second embodiment of the present invention.

When the aligning optical fibers 12 are used for optical alignment as with the first embodiment the lid member 13a is mounted on the exposed part of the V-grooves of the optical fiber guide part 1a on the side of the optical waveguide device 6, covering the dummy optical fibers 4 and the aligning optical fibers 12, and is then pressed from above. A sectional view of the optical fiber guide part 1a at this time is shown in FIG. 11(A). When the lid member 13a is pressed from above, the dummy optical fibers 4 and the aligning optical fibers 12 are pushed by the protrusions 15 of the lid member 13a and thereby pressed against the bottoms of the V-grooves 3.

As with the first embodiment, after the position of the optical fiber guide part 1a with respect to the optical waveguide device 6 is determined, the UV-cure adhesive applied to the junction of the optical fiber guide part 1a and optical waveguide device 6 is irradiated with ultraviolet rays, and consequently the optical fiber guide part 1a and the optical waveguide device 6 are joined together.

Next, without the lid member 13a, as with the first embodiment, the optical fibers 14 are inserted into the guide holes in the optical fiber guide part 1a and a UV-cure adhesive is applied to the exposed part of the V-grooves of the optical fiber guide part 1a on the side of the optical waveguide device 6 or to an undersurface of the lid member 13a. Then, as shown in FIG. 10(B), the lid member 13a is mounted on the exposed part of the V-grooves, covering the dummy optical fibers 4, the aligning optical fibers 12, and the optical fibers 14, and is then pressed from above. Consequently, the dummy optical fibers 4, aligning optical fibers 12, and optical fibers 14 are pushed by the protrusions 15 of the lid member 13a and thereby pressed against the bottoms of the V-grooves 3.

Figure 11B:
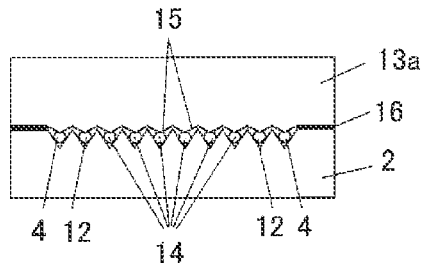

A sectional view of the optical fiber guide part 1a at this time is shown in FIG. 11(B). In FIG. 11(B), reference sign 16 denotes the adhesive. With the lid member 13a being pressed from above, the UV-cure adhesive is irradiated with ultraviolet rays, bonding the lid member 13a to the optical fiber guide part 1a and thereby fixing the optical fibers 14 to the optical fiber guide part 1a.

In the first embodiment, to press all the optical fibers 12 and 14 uniformly against the bottoms of the V-grooves 3 in the V-grooved substrate 2 during and after optical alignment, it is necessary to use a uniform load and a highly flat V-grooved substrate 2. In contrast, according to the present embodiment, the protrusions 15 can be formed on the lid member 13a by machining with high accuracy, and since the optical fibers 12 and 14 can be pressed by the protrusions 15 rather than a flat surface, the optical fibers 12 and 14 can be pressed easily against the bottoms of the V-grooves 3 in the V-grooved substrate 2. Consequently, the present embodiment simplifies the mounting step and implements lower-loss optical connection.

Third Embodiment

Next, a third embodiment of the present invention will be described. The present embodiment uses the optical fiber guide part 1 described in the first embodiment.

Figure 12:
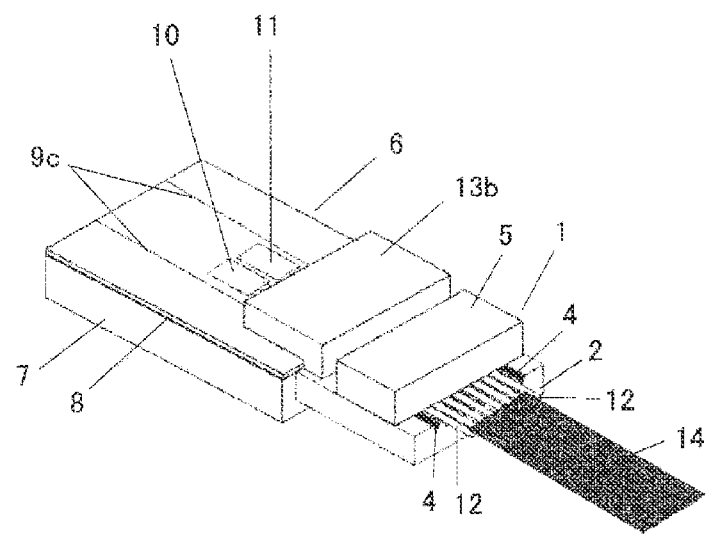
FIG. 12 is a perspective view showing an example of an optical connection structure according to a third embodiment of the present invention.

FIG. 12 is a perspective view showing an example of an optical connection structure according to the present embodiment, where the same components as those in FIGS. 1 to 8 are denoted by the same reference signs as the corresponding components in FIGS. 1 to 8. A basic form is the same as the first embodiment, but a lid member 13b made, for example, of glass is shaped to continuously cover an upper surface of the optical waveguide device 6 adjacent to the optical fiber guide part 1 as well as the exposed part of the V-grooves of the optical fiber guide part 1 on the side of the optical waveguide device 6.

The upper surface of the optical waveguide device 6 differs in height from an upper surface of the V-grooved substrate 2. Also, the upper surface of the optical waveguide device 6 differs slightly in physical hardness from the upper surface of the V-grooved substrate 2. Thus, a step is formed on an undersurface of the lid member 13b to match these differences. The step is capable of pressing the dummy optical fibers 4, aligning optical fibers 12, and optical fibers 14 inserted in the guide holes in the optical fiber guide part 1 against the undersurface of the lid member 13b on the side of the optical fiber guide part and is configured to avoid applying excessive pressure to the upper surface of the optical waveguide device 6.

The method for optical alignment is as described in the first embodiment. Next, in the absence of the lid member 13b, the optical fibers 14 are inserted into the guide holes in the optical fiber guide part 1 as with the first embodiment, a UV-cure adhesive is applied to either the exposed part of the V-grooves of the optical fiber guide part 1 on the side of the optical waveguide device 6 and the upper surface of the optical waveguide device 6 or the undersurface of the lid member 13b, and the lid member 13b is mounted on the exposed part of the V-grooves and optical waveguide device 6 as shown in FIG. 12 and then pressed from above. With the lid member 13b being pressed from above, the UV-cure adhesive is irradiated with ultraviolet rays, bonding the lid member 13b to the optical fiber guide part 1 and the optical waveguide device 6, and consequently the optical fibers 14 are fixed to the optical fiber guide part 1.

In this way, according to the present embodiment, since the lid member 13b is bonded not only to the optical fiber guide part 1, but also to the optical waveguide device 6, the bonding area of the connection can be increased. This can increase mechanical joint strength while decreasing optical connection loss between the optical fibers 14 and the optical waveguide device 6.

Note that the present embodiment may be applied to the second embodiment. That is, the protrusions 15 described in the second embodiment may be provided on the undersurface of the lid member 13b on the side of the optical fiber guide part 1.

Fourth Embodiment

Figure 13:
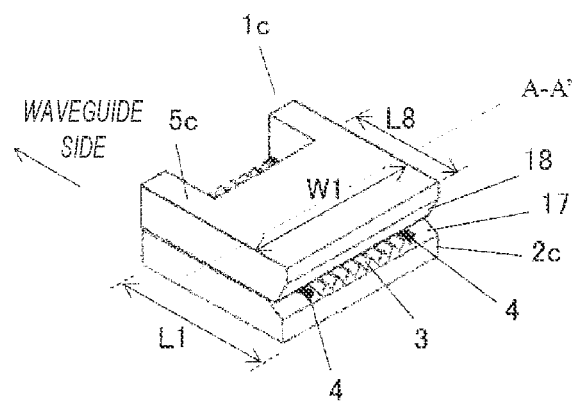
FIG. 13 is a perspective view showing a configuration of an optical fiber guide part according to a fourth embodiment of the present invention.

Next, a fourth embodiment of the present invention will be described. FIG. 13 is a perspective view showing a configuration of an optical fiber guide part according to the present embodiment, where the same components as those in FIG. 1 are denoted by the same reference signs as the corresponding components in FIG. 1. The optical fiber guide part 1c according to the present embodiment includes a V-grooved substrate 2c, which is made, for example, of glass and in which plural V-grooves 3 are formed, dummy optical fibers 4 placed in two V-grooves 3 on both sides out of the plural V-grooves 3, and a lid member 5c made, for example, of glass and integrated with the V-grooved substrate 2c by adhesive.

Plural V-grooves 3 are formed in a surface of the tabular V-grooved substrate 2c quadrangular in planar view as with the V-grooved substrate 2 of the first embodiment. A difference from the V-grooved substrate 2 lies in that a guide groove 17 is formed by chamfering an end face on the optical fiber insertion side.

The lid member 5c is provided with a flat undersurface facing the V-grooved substrate 2c and is made of glass as with the lid member 5 of the first embodiment. The width W1 of the lid member 5c in the direction orthogonal to the light propagation direction (extending direction of the V-grooves 3) is equal to the width of the V-grooved substrate 2c and a length L8 of a central part of the lid member 5c in the light propagation direction is shorter than the length L1 of the V-grooved substrate 2c. The V-grooves 3 in the V-grooved substrate 2c are exposed on the optical waveguide device side. Also, as with the V-grooved substrate 2c, the lid member 5c has a guide groove 18 formed by chamfering an end face on the optical fiber insertion side.

Note that the guide grooves 17 and 18 are intended to facilitate insertion of optical fibers into the optical fiber guide part 1c, and are not essential components of the present embodiment.

As with the first embodiment, the V-grooved substrate 2c and lid member 5c are pasted together by adhesive in those regions of the V-grooved substrate 2c in which the V-grooves 3 are absent, and in the stage of pasting, the lid member 5c is bonded to the V-grooved substrate 2c without being pressed. Therefore, as with the first embodiment, there are clearances between the guide holes having a triangular cross section and the optical fibers (aligning optical fibers 12 and optical fibers 14) inserted into the guide holes, where the guide holes are formed by the V-grooves 3 in the V-grooved substrate 2c in conjunction with the lid member 5c placed on the V-grooves 3.

Figure 14A:
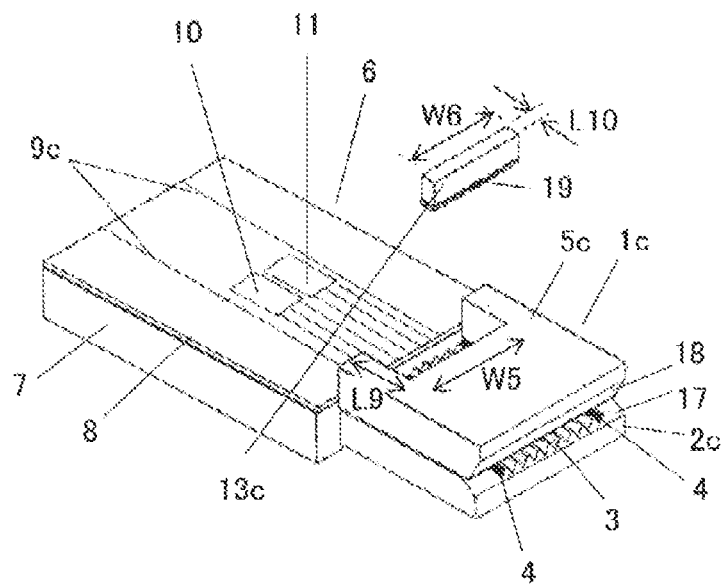
FIGS. 14(A) and 14(B) are perspective views showing an example of an optical connection structure according to the fourth embodiment of the present invention.
Figure 14B:
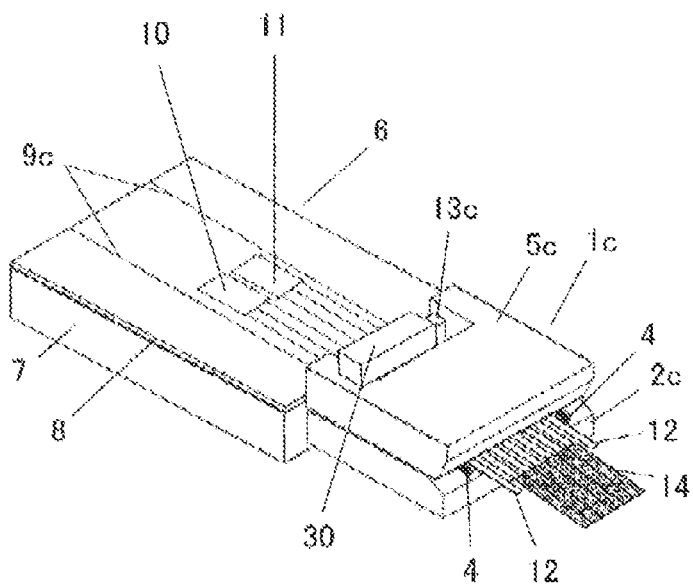

FIGS. 14(A) and 14(B) are perspective views showing an example of an optical connection structure according to the present embodiment, where FIG. 14(A) shows a state before insertion of optical fibers and FIG. 14(B) shows a state after insertion of the optical fibers.

According to the present embodiment, for example, a member shaped as a rectangular parallelepiped and made of glass is used as a lid member 13c adapted to press the aligning optical fibers inserted into the optical fiber guide part 1c during optical alignment and the optical fibers 14 inserted into the optical fiber guide part 1c after the optical alignment. A length L10 of the lid member 13c in the light propagation direction (extending direction of the V-grooves 3) is equal to or shorter than a length L9 of an exposed part of the V-grooves of the optical fiber guide part 1c on the side of the optical waveguide device 6. Also, a width W6 of the lid member 13c in a direction orthogonal to the light propagation direction is equal to or shorter than a width W5 of the exposed part of the V-grooves. An elastic adhesive 19 in the form of tape is stuck to an undersurface of the lid member 13c, the undersurface being opposed to the exposed part of the V-grooves of the optical fiber guide part 1c on the side of the optical waveguide device 6.

When the aligning optical fibers 12 are used for optical alignment as with the first embodiment, the lid member 13c is mounted on the exposed part of the V-grooves of the optical fiber guide part 1c on the side of the optical waveguide device 6, covering the dummy optical fibers 4 and the aligning optical fibers 12, and is then pressed from above. When the lid member 13c is pressed from above, the dummy optical fibers 4 and the aligning optical fibers 12 are pushed by the elastic adhesive 19 of the lid member 13c and thereby pressed against the bottoms of the V-grooves 3.

As with the first embodiment, after the position of the optical fiber guide part 1c with respect to the optical waveguide device 6 is determined, the UV-cure adhesive applied to the junction of the optical fiber guide part 1c and the optical waveguide device 6 is irradiated with ultraviolet rays, and consequently the optical fiber guide part 1c and the optical waveguide device 6 are joined together.

Next, in the absence of the lid member 13c, the optical fibers 14 are inserted into the guide holes in the optical fiber guide part 1c as with the first embodiment, and as shown in FIG. 14(B), the lid member 13c is mounted on the exposed part of the V-grooves, covering the dummy optical fibers 4, the aligning optical fibers 12, and the optical fibers 14, and is then pressed from above. Consequently, the dummy optical fibers 4, aligning optical fibers 12, and optical fibers 14 are pushed by the elastic adhesive 19 of the lid member 13c and thereby pressed against the bottoms of the V-grooves 3. Also, the optical fibers 14 are fixed to the optical fiber guide part 1c by adhesive force of the elastic adhesive 19.

According to the present embodiment, when the elastic adhesive 19 in the form of tape on the undersurface of the lid member 13c deforms, the optical fibers 12 and 14 are pressed separately and thus are pressed easily against the bottoms of the V-grooves 3 in the V-grooved substrate 2c. Consequently, the present embodiment simplifies the mounting step and implements lower-loss optical connection.

Note that according to the present embodiment, since the lid member 13c is stuck to the optical fiber guide part 1c by the adhesive force of the elastic adhesive 19, making it impossible for the lid member 13c alone to constantly press the dummy optical fibers 4, aligning optical fibers 12, and optical fibers 14, desirably a pressing mechanism 30 adapted to press the lid member 13c in the state shown in FIG. 14(B) from above is provided. The pressing mechanism 30, for example, may be configured to press the lid member 13c by its own weight, may be configured to press the lid member 13c by restoring force of a spring, or may have another structure.

Also, although the elastic adhesive 19 in the form of tape is used as an elastic adhesive in the present embodiment, any elastic adhesive may be used. The elastic adhesive may be based on silicone, silylated urethane, denatured silicone, silylated urethane, or a derivative thereof. Also, adhesives available for use include adhesives called rubber adhesives as well as adhesives based on modified silicone epoxy matrix, non-crosslinked resin such as acrylic, or crosslinked adhesive resin with elastic modulus reduced by the addition of a plasticizer such as a filler.

Also, the third embodiment may be applied to the present embodiment. That is, the lid member 13c may be shaped to continuously cover the upper surface of the optical waveguide device 6 adjacent to the optical fiber guide part 1c as well as the exposed part of the V-grooves of the optical fiber guide part 1c on the side of the optical waveguide device 6, and the elastic adhesive 19 may be stuck to an undersurface of the lid member 13c, the undersurface being opposed to the exposed part of the V-grooves. In that case, the adhesive is applied to the upper surface of the optical waveguide device 6 or to the undersurface of the lid member 13c, the undersurface being opposed to the upper surface of the optical waveguide device 6, and the lid member 13c is bonded to the optical waveguide device 6.

Fifth Embodiment

Figure 15:
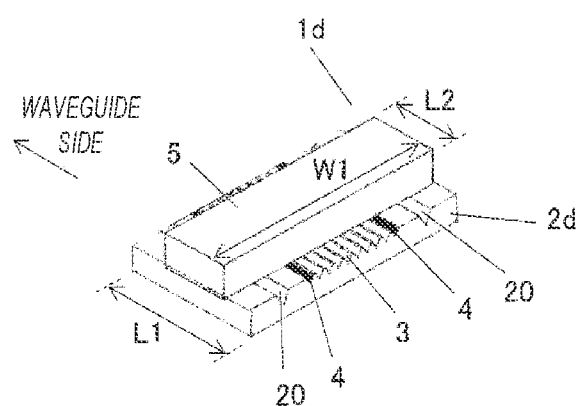
FIG. 15 is a perspective view showing a configuration of an optical fiber guide part according to a fifth embodiment of the present invention.

Next, a fifth embodiment of the present invention will be described. FIG. 15 is a perspective view showing a configuration of an optical fiber guide part according to the present embodiment, where the same components as those in FIG. 1 are denoted by the same reference signs as the corresponding components in FIG. 1. The optical fiber guide part 1d according to the present embodiment includes a V-grooved substrate 2d, which is made, for example, of glass and in which plural V-grooves 3 and two guiding V-grooves 20 are formed, dummy optical fibers 4 placed in two V-grooves 3 on both sides out of the plural V-grooves 3, and a lid member 5 made, for example, of glass and integrated with the V-grooved substrate 2d by adhesive.

Plural V-grooves 3 are formed in a surface of the tabular V-grooved substrate 2d quadrangular in planar view as with the V-grooved substrate 2 of the first embodiment. Furthermore, the two guiding V-grooves 20 are formed in parallel to the V-grooves 3 on both sides of the V-grooves 3.

As with the first embodiment, the width W1 of the lid member 5 in the direction orthogonal to the light propagation direction (extending direction of the V-grooves 3) is equal to the width of the V-grooved substrate 2d and a length L2 of the lid member 5 in the light propagation direction is shorter than the length L1 of the V-grooved substrate 2d, exposing surfaces of the V-grooved substrate 2d on the optical waveguide device side and the optical fiber insertion side.

As with the first embodiment, the V-grooved substrate 2d and the lid member 5 are pasted together by adhesive in those regions of the V-grooved substrate 2d in which the V-grooves 3 are absent, and in the stage of pasting, the lid member 5 is bonded to the V-grooved substrate 2d without being pressed. Therefore, as with the first embodiment, there are clearances between the guide holes having a triangular cross section and the optical fibers (aligning optical fibers 12 and optical fibers 14) inserted into the guide holes, where the guide holes are formed by the V-grooves 3 in the V-grooved substrate 2d in conjunction with the lid member 5 placed on the V-grooves 3.

Figure 16A:
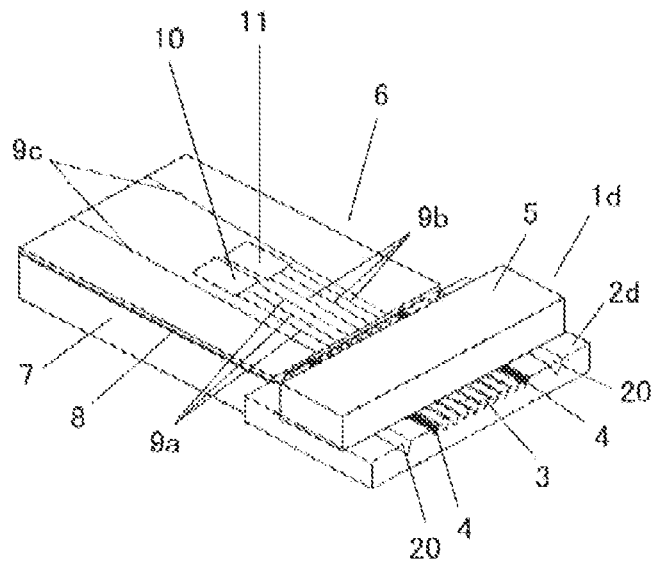
FIGS. 16(A) and 16(B) are perspective views showing an example of an optical connection structure according to the fifth embodiment of the present invention.
Figure 16B:
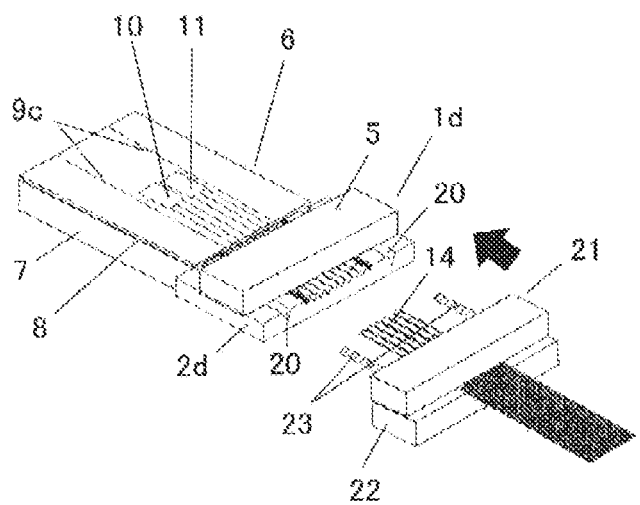

FIGS. 16(A) and 16(B) are perspective views showing an example of an optical connection structure according to the present embodiment, where FIG. 16(A) shows a state before insertion of optical fibers and FIG. 16(B) shows a state during insertion of the optical fibers. The method for optical alignment is similar to the first embodiment, and thus description thereof will be omitted.

Next, the optical fibers 14 are inserted into the guide holes in the optical fiber guide part 1d as with the first embodiment, but the present embodiment has a structure in which plural (six, according to the present embodiment) optical fibers 14 are fixed to a plug 21. The plug 21 includes a plug housing 22 used to fix the optical fibers 14 such that a protruding tip will be inserted into the guide holes in the optical fiber guide part 1d when the plug is attached to the optical fiber guide part 1d, and two guide pins 23 fixed to the plug housing 22 such that protruding tips will be fitted into the guiding V-grooves 20 in the optical fiber guide part 1d when the plug 21 is attached to the optical fiber guide part 1d. The two guide pins 23 and the 6-core optical fiber cable 14 are fixed to the plug housing 22 in such a way as to be parallel to each other.

When the guide pins 23 of the plug 21 are inserted and fitted into the guiding V-grooves 20 in the optical fiber guide part 1d, tips of the optical fibers 14 protruding from the plug 21 are inserted into the guide holes in the optical fiber guide part 1d. In so doing, desirably the length of the optical fibers 14 protruding from the plug 21 is long enough for the end faces of the optical fibers 14 to butt against the end faces of the cores 9a and 9b making up the optical waveguides of the optical waveguide device 6 when the plug 21 is inserted until that end face of the plug housing 22 which is on the side of the optical fiber guide part 1d comes into contact with that end face of the V-grooved substrate 2d of the optical fiber guide part 1d which is on the side of the plug 21.

Figure 17:
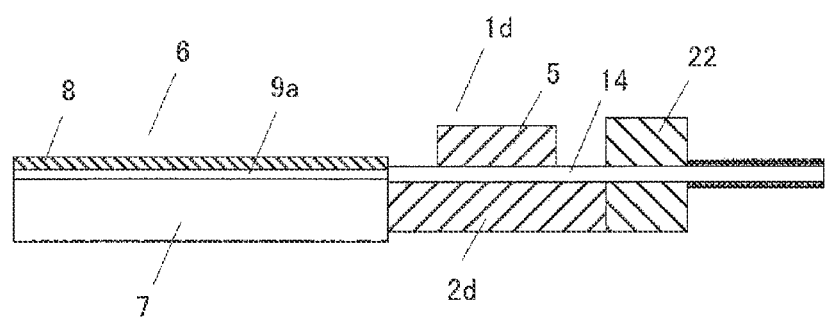
FIG. 17 is a sectional view showing an optical connection structure with a plug inserted therein in the fifth embodiment of the present invention.

A sectional view of an optical connection structure with the plug 21 (optical fibers 14) inserted therein is shown in FIG. 17. In this way, with the optical fibers 14 inserted in the guide holes in the optical fiber guide part 1d, the dummy optical fibers 4 and optical fibers 14 can be pressed against the bottoms of the V-grooves 3 in the V-grooved substrate 2d using any of the lid members 13, 13a, 13b, and 13c described in the first to fourth embodiments.

In this way, according to the present embodiment, using the optical fiber guide part 1d in which the guiding V-grooves 20 are formed and the plug 21 to which the optical fibers 14 are fixed, the optical fibers 14 and optical fiber guide part 1d can be positioned roughly, which makes it easy to insert the optical fibers 14 into the optical fiber guide part 1d and allows the mounting step to be further simplified.

Sixth Embodiment

Figure 18:
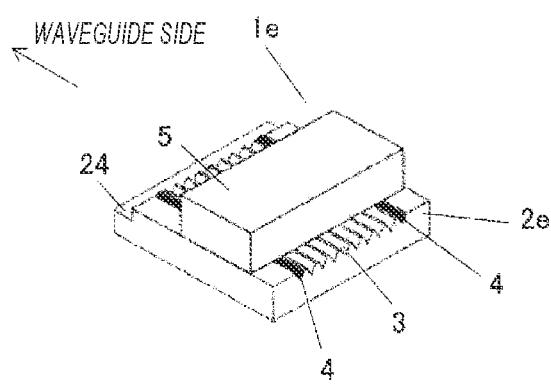
FIG. 18 is a perspective view showing a configuration of an optical fiber guide part according to a sixth embodiment of the present invention.

Next, a sixth embodiment of the present invention will be described. FIG. 18 is a perspective view showing a configuration of an optical fiber guide part according to the present embodiment, where the same components as those in FIG. 1 are denoted by the same reference signs as the corresponding components in FIG. 1. The optical fiber guide part 1e according to the present embodiment includes a V-grooved substrate 2e, which is made, for example, of glass and in which plural V-grooves 3 are formed, dummy optical fibers 4 placed in two V-grooves 3 on both sides out of the plural V-grooves 3, and a lid member 5 made, for example, of glass and integrated with the V-grooved substrate 2e by adhesive.

Plural V-grooves 3 are formed in a surface of the tabular V-grooved substrate 2e quadrangular in planar view as with the V-grooved substrate 2 of the first embodiment. A difference from the V-grooved substrate 2 lies in that a dug portion 24 is provided by uniformly removing that end portion of the V-grooved substrate 2e which is on the side of the optical waveguide device 6 to a position deeper than the V-grooves 3 from a surface of the V-grooved substrate 2e. The lid member 5 is as described in the first embodiment.

Figure 19A:
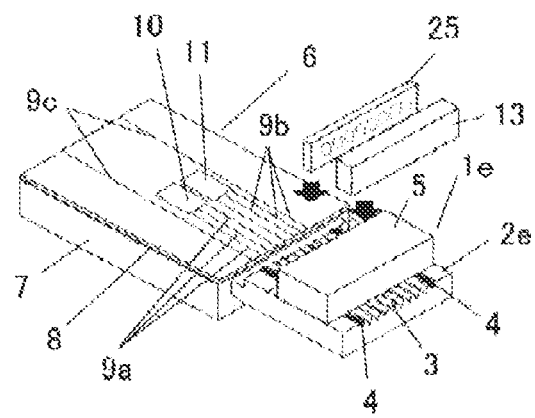
FIGS. 19(A) and 19(B) are perspective views showing an example of an optical connection structure according to the sixth embodiment of the present invention.
Figure 19B:
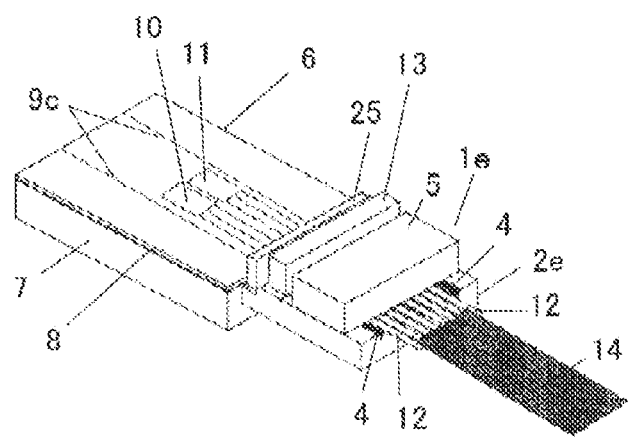

FIGS. 19(A) and 19(B) are perspective views showing an example of an optical connection structure according to the present embodiment, where FIG. 19(A) shows a state before insertion of optical fibers and FIG. 19(B) shows a state after insertion of the optical fibers.

According to the present embodiment, to match mode field size between the optical fibers and the optical waveguides of the optical waveguide device 6, a functional element 25 such as a microlens array is mounted at a location of the dug portion 24 in the V-grooved substrate 2e of the optical fiber guide part 1e before optical alignment.

On the functional element 25, as many lenses (eight, according to the present embodiment) as the number of V-grooves 3 excluding the V-grooves 3 in which the dummy optical fibers 4 are placed (i.e., the number of cores 9a, 9b, and 9c in the optical waveguide device 6) are integrated.

Figure 20:
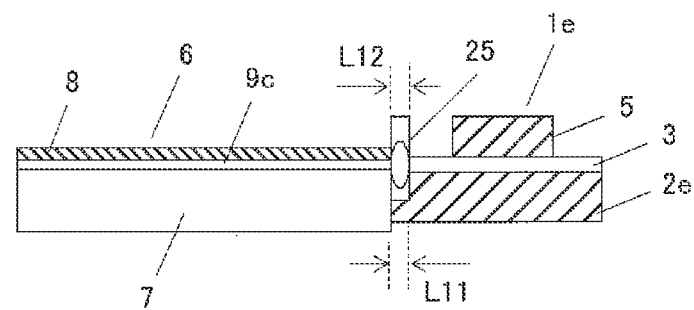
FIG. 20 is a sectional view showing an optical connection structure with a functional element mounted thereon in the sixth embodiment of the present invention.

A sectional view of an optical connection structure with a functional element mounted thereon is shown in FIG. 20. A length L12 of the functional element 25 in the light propagation direction (extending direction of the V-grooves 3) is equal to or shorter than a length L11 of the dug portion 24 in the optical fiber guide part 1e. Also, the functional element 25 is mounted on the optical fiber guide part 1e in such a way that optical axes of the lenses will coincide with optical axes of the respective optical fibers 14 inserted into the V-grooves 3 and is bonded to the optical fiber guide part 1e in regions in which the lenses are absent.

When the aligning optical fibers 12 are used for optical alignment as with the first embodiment, the lid member 13 is mounted on the exposed part of the V-grooves between the functional element 25 and the lid member 5 of the optical fiber guide part 1e, covering the dummy optical fibers 4 and the aligning optical fibers 12, and is then pressed from above. As with the first embodiment, after the position of the optical fiber guide part 1e with respect to the optical waveguide device 6 is determined, the UV-cure adhesive applied to the junction of the optical fiber guide part 1e and the optical waveguide device 6 is irradiated with ultraviolet rays, and consequently the optical fiber guide part 1e and the optical waveguide device 6 are joined together.

Next, in the absence of the lid member 13, the optical fibers 14 are inserted into the guide holes in the optical fiber guide part 1e as with the first embodiment, a UV-cure adhesive is applied to the exposed part of the V-grooves of the optical fiber guide part 1e on the side of the optical waveguide device 6 or to an undersurface of the lid member 13, and as shown in FIG. 19(B), the lid member 13 is mounted on the exposed part of the V-grooves between the functional element 25 and lid member 5 of the optical fiber guide part 1e, and is then pressed from above. The UV-cure adhesive is irradiated with ultraviolet rays with the lid member 13 being pressed from above, bonding the lid member 13 to the optical fiber guide part 1e and thereby fixing the optical fibers 14 to the optical fiber guide part 1e.

According to the present embodiment, since the functional element 25 is mounted on the optical fiber guide part 1e, the optical waveguide device 6 can be connected with the optical fibers 14 with the mode field sizes of the optical waveguides of the optical waveguide device 6 being increased, making it possible to reduce implementation tolerances and losses.

Note that as long as effects similar to those of the present embodiment can be achieved, not only a microlens array, but also a ball lens array, meta surface lens array, lensed fiber array, or the like can be used, and other functional elements such as a wave plate array, polarizing plate array, optical prism array, and mirror array can be integrated.

Although the present embodiment has been described by citing an example in which the lid member 13 of the first embodiment is used, the lid member 13a of the second embodiment or the lid member 13c of the fourth embodiment may be used. Also, by providing the guiding V-grooves 20 in the optical fiber guide part 1e as with the fifth embodiment, the optical fibers 14 may be inserted into the guide holes in the optical fiber guide part 1e using the plug 21.

Note that in the first to sixth embodiments, a housing structure, guiding structure, adhesive, spring structure, protective structure, and/or other structure for connection are used as appropriate, but illustrations thereof are omitted in the drawings in which such structures are not principal concerns of the embodiments of the present invention. Such structures may be added to the first to sixth embodiments, as appropriate, depending on the purpose of connection and the like.

Also, naturally the present invention is not limited to the first to sixth embodiments, and may be any optical waveguide device such as described in the conventional technique as long as the optical waveguide device is provided with a one-dimensional waveguide array along an optical axis. For example, as light-emitting elements of the optical waveguide device 6, plural distributed-feedback laser diodes (DFB-LDs) made of InP may be prepared and optically connected separately to silicon waveguides or glass waveguides, forming an integrated luminous element. Also, a DFB-LD array such as described above may be pasted onto a Si substrate, forming a luminous element integrated with Si waveguides. Furthermore, an InP material or the like may be pasted onto a Si substrate forming a laser layer, and moreover Si waveguides, waveguides made of a Si oxide (silicon monoxide or silicon oxynitride film), and the like may be integrated, forming an integrated luminous element.

Similarly, regarding the light-receiving elements of the optical waveguide device 6, PDs made of indium gallium arsenide, germanium, or the like may be integrated by being pasted as with the example of light-emitting elements or by being optically connected separately to another waveguide device, to thereby form an integrated light-receiving element. Also, luminous elements may be connected separately with external modulation elements or integrated on a same material. For example, the light-receiving elements may be integrated with modulation elements made up of Si waveguides and thermooptic switches or electrooptic switches, modulation elements made up of InP waveguides and thermooptic switches or electrooptic switches, or modulation elements made up of a ferroelectric substance such as LN, or a modulation element function or a direct modulation function such as an electroabsorption effect may be directly integrated and formed on the luminous elements. Specific optical waveguide layouts are not limited to the first to sixth embodiments.

Also, although in the first to sixth embodiments, optical alignment is carried out using the aligning optical fibers 12, the optical alignment may be carried out using the optical fibers 14 used originally. In that case, the optical fibers 14 are connected to the receiver array 11 or the like used in the optical waveguide device 6 rather than to the optical waveguides (cores 9c) for optical alignment, and a monitor PD or the like may be provided in the receiver array 11, or a receiver PD of the receiver array 11 may be utilized for the purpose of optical alignment. Also, an optical coupler or grating coupler may be provided on the optical waveguide device 6 to which the optical fibers 14 used for optical alignment are connected and light extracted by the optical coupler or grating coupler may be received by an external PD. The use of the optical fibers 14 for optical alignment in this way eliminates the need for optical waveguides for optical alignment or the aligning optical fibers 12, making it possible to reduce a circuit scale and cost.

Also, the types of materials for the V-grooved substrates 2, 2c, 2d, and 2e and the lid members 5, 5a, 5c, 13, 13a, 13b, 13c are not important as long as the materials lend themselves to high-accuracy machining. In a typical example, V-grooves or the like can be formed by applying cutting to a glass material. Also, the V-grooved substrate 2, 2c, 2d, and 2e can be implemented by applying anisotropic etching to a Si substrate or the like. Besides, similar V-grooves can be formed using a polymer-based imprinting technique, sintering of ceramics, or the like.

INDUSTRIAL APPLICABILITY

Embodiments of the present invention are applicable to a technique for connecting optical fibers to an optical waveguide device.

REFERENCE SIGNS LIST 1, 1a, 1c, 1d, 1e Optical fiber guide part
2, 2c, 2d, 2e V-grooved substrate
3 V-groove
4 Dummy optical fiber
5, 5a, 5c, 13, 13a, 13b, 13c Lid member
6 Optical waveguide device
7 Silicon substrate
8 Clad
9a, 9b, 9c Core
10 Transmitter array
11 Receiver array
12 Aligning optical fiber
14 Optical fiber
15 Protrusion
16 Adhesive
17, 18 Guide groove
19 Elastic adhesive
20 Guiding V-groove
21 Plug
22 Plug housing
23 Guide pin
24 Dug portion
25 Functional element
30 Pressing mechanism

The invention claimed is:

1. An optical fiber guide part comprising:
a V-grooved substrate having a surface and comprising a plurality of V-grooves in the surface, the plurality of V-grooves being parallel to one another;
a first lid member fixed to a top of the V-grooved substrate such that a lateral part of a top surface of the V-grooves is exposed in a region of the V-grooved substrate, the exposed region extending laterally from the first lid member to an end face of the V-grooved substrate configured to face a side of an optical waveguide device; and
a second lid member fixed to the exposed part of the V-grooves of the V-grooved substrate, and configured to press, from above, optical fibers in guide holes defined by the V-grooves and the first lid member on the V-grooves,
wherein the optical fiber guide part is configured to fix the optical fibers configured to be optically connected to optical waveguides of the optical waveguide device and is configured to be adhesively fixed to the optical waveguide device such that end faces of the optical fibers in the guide holes facing the side of the optical waveguide device and end faces of the optical waveguides facing a side of the optical fiber guide part face each other.

2. The optical fiber guide part according to claim 1, wherein the optical fibers in the guide holes include a dummy optical fiber larger in outside diameter than the optical fibers configured to be optically connected to the optical waveguides of the optical waveguide device.

3. The optical fiber guide part according to claim 1, wherein the optical fibers in the guide holes include an aligning optical fiber configured to be optically connected to an aligning optical waveguide of the optical waveguide device.

4. The optical fiber guide part according to claim 1, wherein the second lid member includes a plurality of protrusions in parallel on an undersurface of the second lid member facing the exposed part of the V-grooves and having a same pitch as the V-grooves, wherein the protrusions are configured to be fixed to the exposed part of the V-grooves and are configured to press, from above, the optical fibers in the guide holes.

5. The optical fiber guide part according to claim 1, further comprising:
an elastic adhesive on an undersurface of the second lid member facing the exposed part of the V-grooves and configured to fix the second lid member to the exposed part of the V-grooves of the V-grooved substrate; and
a pressing mechanism configured to press the second lid member from above.

6. The optical fiber guide part according to claim 1, wherein:
the second lid member is shaped to continuously cover surfaces from the exposed part of the V-grooves of the V-grooved substrate to an upper surface of the optical waveguide device adjacent to the optical fiber guide part; and
a part of the second lid member facing the upper surface of the optical waveguide device is configured to be fixed to the optical waveguide device.

7. The optical fiber guide part according to claim 1, wherein the V-grooved substrate of the optical fiber guide part includes a dug portion formed by removing an end portion on a side of the optical waveguide device to a position deeper than the V-grooves from the surface.

8. The optical fiber guide part according to claim 7, further comprising a functional element provided in the dug portion and configured to match mode field size between the optical fibers inserted in the guide holes and the optical waveguides of the optical waveguide device.

9. An optical connection structure comprising:
an optical waveguide device; and
an optical fiber guide part comprising:
a V-grooved substrate having a surface and comprising a plurality of V-grooves in the surface, the plurality of V-grooves being parallel to one another;
a first lid member fixed to a top of the V-grooved substrate such that a lateral part of a top surface of the V-grooves is exposed in a region of the V-grooved substrate, the exposed region extending laterally from the first lid member to an end face of the V-grooved substrate facing the optical waveguide device; and
a second lid member fixed to the exposed part of the V-grooves, and configured to press, from above, optical fibers in guide holes defined by the V-grooves and the first lid member on the V-grooves,
wherein the optical fiber guide part is configured to fix the optical fibers optically connected to optical waveguides of the optical waveguide device and is adhesively fixed to the optical waveguide device such that end faces of the optical fibers in the guide holes facing a side of the optical waveguide device and end faces of the optical waveguides facing the optical fiber guide part face each other.

10. The optical connection structure according to claim 9, wherein the optical fibers in the guide holes include a dummy optical fiber larger in outside diameter than the optical fibers optically connected to the optical waveguides of the optical waveguide device.

11. The optical connection structure according to claim 9, wherein the optical fibers in the guide holes include an aligning optical fiber optically connected to an aligning optical waveguide of the optical waveguide device.

12. The optical connection structure according to claim 9, wherein the second lid member includes a plurality of protrusions in parallel on an undersurface of the second lid member facing the exposed part of the V-grooves and having a same pitch as the V-grooves, wherein the protrusions are fixed to the exposed part of the V-grooves and are configured to press, from above, the optical fibers in the guide holes.

13. The optical connection structure according to claim 9, further comprising:
an elastic adhesive on an undersurface of the second lid member facing the exposed part of the V-grooves and configured to fix the second lid member to the exposed part of the V-grooves of the V-grooved substrate; and
a pressing mechanism configured to press the second lid member from above.

14. The optical connection structure according to claim 9, wherein:
the second lid member is shaped to continuously cover surfaces from the exposed part of the V-grooves of the V-grooved substrate to an upper surface of the optical waveguide device adjacent to the optical fiber guide part; and
a part of the second lid member facing the upper surface of the optical waveguide device is fixed to the optical waveguide device.

15. The optical connection structure according to claim 9, wherein the V-grooved substrate of the optical fiber guide part includes a dug portion formed by removing an end portion on a side of the optical waveguide device to a position deeper than the V-grooves from the surface.

16. The optical connection structure according to claim 15, further comprising a functional element provided in the dug portion and configured to match mode field size between the optical fibers inserted in the guide holes and the optical waveguides of the optical waveguide device.

17. A manufacturing method for an optical connection structure, the manufacturing method comprising:
providing an optical fiber guide part comprising:
a V-grooved substrate having a surface and comprising a plurality of V-grooves in the surface, the plurality of V-grooves being parallel to one another; and
a first lid member adhesively fixed to a top of the V-grooved substrate such that a lateral part of a top surface of the V-grooves are exposed in a region of the V-grooved substrate extending laterally from the first lid member to an end face of the V-grooved substrate;
providing an optical waveguide device adhesively fixed to the optical fiber guide part, the optical waveguide device comprising optical waveguides;
inserting optical fibers in guide holes formed by the V-grooves and the first lid member fixed on the V-grooves, a plurality of the optical fibers being optically connected to the optical waveguides of the optical waveguide device;
positioning the optical fibers such that end faces of the optical fibers on a side of the optical waveguide device and end faces of the optical waveguides of the optical waveguide device on a side of the optical waveguide device facing the optical fiber guide part face each other;

after the positioning, adhesively fixing the optical fiber guide part to the optical waveguide device; and fixing a second lid member to the exposed part of the V-grooves of the V-grooved substrate on a side of the optical fiber guide part facing the optical waveguide device by pressing, from above, the optical fibers inserted in the guide holes.

18. The manufacturing method according to claim 17, wherein the optical fibers inserted in the guide holes include a dummy optical fiber larger in outside diameter than the plurality of the optical fibers optically connected to the optical waveguides of the optical waveguide device.

19. The manufacturing method according to claim 17, wherein the optical fibers in the guide holes include an aligning optical fiber optically connected to an aligning optical waveguide of the optical waveguide device.

20. The manufacturing method according to claim 17, wherein the second lid member includes a plurality of protrusions formed in parallel on an undersurface of the second lid member facing the exposed part of the V-grooves and having a same pitch as the V-grooves, the method further comprising:

fixing the protrusions to the exposed part of the V-grooves; and pressing, from above, the optical fibers inserted in the guide holes.

\* \* \* \* \*